(12) United States Patent
Altendorf

(10) Patent No.: US 7,626,705 B2
(45) Date of Patent: Dec. 1, 2009

(54) CHROMATIC SENSOR LENS CONFIGURATION

(75) Inventor: Eric Altendorf, Everett, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 469 days.

(21) Appl. No.: 11/694,820

(22) Filed: Mar. 30, 2007

(65) Prior Publication Data

US 2008/0239278 A1    Oct. 2, 2008

(51) Int. Cl.
    *G01N 21/55* (2006.01)
(52) U.S. Cl. ..................................... 356/445
(58) Field of Classification Search ............... None
    See application file for complete search history.

(56) References Cited

U.S. PATENT DOCUMENTS

| | | | |
|---|---|---|---|
| 3,807,836 A * | 4/1974 | Baker .................... | 359/775 |
| 4,585,349 A | 4/1986 | Gross | |
| 4,854,680 A | 8/1989 | Kikuchi | |
| 5,386,312 A | 1/1995 | Spencer | |
| 5,785,651 A | 7/1998 | Kuhn | |
| 6,688,783 B2 | 2/2004 | Janosik | |
| 7,561,273 B2 * | 7/2009 | Stautmeister et al. ........ | 356/445 |
| 2004/0109170 A1 | 6/2004 | Schick | |
| 2006/0109483 A1 | 5/2006 | Marx | |

FOREIGN PATENT DOCUMENTS

| WO | 96/41123 A1 | 12/1996 |
|---|---|---|
| WO | 02/08685 A2 | 1/2002 |
| WO | 2004/034244 A1 | 4/2004 |

OTHER PUBLICATIONS

European Search Report dated Aug. 18, 2008, issued in corresponding Application No. 08102239.4, filed Mar. 4, 2008.
Geary, J.M., "Introduction to Lens Design," Willmann-Bell, 2002, p. 176.
Molesini, G., and F. Quercioli, "Pseudocolor Effects of Longitudinal Chromatic Aberration," J. Optics (Paris) 17(6):279-282.
Smith, W.J., "Modern Optical Engineering," Third Edition, McGraw-Hill, 2000, p. 94.
Stil S.A., "Optical Pens Micrometric Measurement Range," Aix-en-Provence, France, brochure, published on or before Mar. 6, 2007.
Villatoro. J. et al., "Fabrication and Modeling of Uniform-Waist Single-Mode Tapered Optical Fiber Sensors," Applied Optics 42(13):2278-2283, May 1, 2003.

* cited by examiner

*Primary Examiner*—Gregory J Toatley, Jr.
*Assistant Examiner*—Rebecca C Slomski
(74) *Attorney, Agent, or Firm*—Christensen O'Connor Johnson Kindness PLLC

(57) ABSTRACT

A chromatically dispersive lens configuration may be utilized in optical pens for chromatic range sensing. The lens configuration may include a negative power doublet lens and a positive power lens portion. The Abbe numbers of lenses included in the positive power lens portion may be between the Abbe numbers of the two portions of the doublet lens. The relationship between the Abbe numbers of the materials used in two portions of the doublet lens is generally opposite to their relationship as used in standard doublet lenses of similar geometry. The doublet lens may have a negative spherical aberration which effectively cancels a positive spherical aberration that arises in the positive lens portion. In one embodiment all of the lens elements in the lens configuration are spherical lenses. The lens configuration can be implemented with dimensions which fit a standard commercial optical pen, while providing improved range sensing performance.

17 Claims, 4 Drawing Sheets

200

| Lens Element | $v_d$ | $n_d$ |
|---|---|---|
| 101A | 25.4 | 1.8 |
| 101B | 45.8 | 1.5 |
| 102 | 35.3 | 1.7 |
| 103 | 39.3 | 1.7 |
| 104 | 39.7 | 1.7 |

*Fig.2.*

CHROMATIC SENSOR LENS CONFIGURATION

FIELD OF THE INVENTION

The invention relates generally to precision measurement instruments, and more particularly to a chromatic sensor lens configuration such as may be utilized in an optical pen for chromatic confocal range sensing.

BACKGROUND OF THE INVENTION

Controlled chromatic aberration techniques may be utilized for distance sensing metrology applications. As described in "Pseudocolor Effects of Longitudinal Chromatic Aberration", G. Molesini and S. Quercioli, J. Optics (Paris), 1986, Volume 17, No. 6, pages 279-282, controlled longitudinal chromatic aberration may be introduced in an optical imaging system, causing the imaging system focal length to vary with wavelength, which provides means for optical metrology. In particular, a lens can be designed whose back focal length (BFL) is a monotonic function of wavelength. In white light operation such a lens exhibits a rainbow of axially dispersed foci that can be used as a spectral probe for distance sensing applications.

It is also known to use chromatic confocal techniques in optical height sensors. As described in U.S. Patent Application Publication No. US2006/0109483 A1, which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the height of the surface determines which wavelength is best focused. Upon reflection from the surface, the light is refocused onto a small detector aperture, such as a pinhole or the end of an optical fiber. Upon reflection from a surface and passing back through the optical system to the in/out fiber, only the wavelength that is well-focused on the surface is well-focused on the fiber. All of the other wavelengths are poorly focused on the fiber, and so will not couple much power into the fiber. Therefore, the signal level will be greatest for the wavelength corresponding to the height of the object. A spectrometer at the detector measures the signal level for each wavelength, which effectively indicates the height of the object.

Certain manufacturers refer to a practical and compact optical assembly that is suitable for chromatic confocal ranging in an industrial setting as a chromatic point sensor (CPS) and/or as an "optical pen". One example of (CPS) optical pen instruments that measure Z height are those manufactured by STIL, S.A. of Aix-en-Provence, France (STIL S.A.). As a specific example, the STIL optical pen model number OP 300NL measures Z heights and has a 300 micron range. However, for various applications, improvements in various aspects of currently available optical pens may be desirable (e.g. improved optical throughput, reduced measurement spot size, improved measurement resolution, etc.).

The present invention is directed to providing an improved chromatic sensor lens configuration, such as may be utilized in a CPS optical pen for chromatic range sensing.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A chromatic sensor lens configuration is provided for a compact CPS optical pen. The chromatic sensor lens configuration is a chromatically dispersive lens configuration. In order to appreciate the value of the design features disclosed herein, it is essential to appreciate that the types of CPS optical pens that are the subject of this invention, are exquisitely sensitive, providing surface height measurement resolution on the order of nanometers. This extraordinary measurement performance is, in turn, exquisitely sensitive to the exact construction of the optical pen. Measuring performance is altered and/or degraded with the smallest variations in the optical pen configuration. In this context, a chromatic sensor lens configuration according to this invention provides significant advantages over the lens configurations previously used in CPS optical pens.

In accordance with one aspect of the invention, in one embodiment, the chromatically dispersive lens configuration is utilized in an optical element portion of a CPS optical pen that also includes a housing, an in/out optical fiber, and a detector aperture. The in/out optical fiber outputs source radiation and receives reflective radiation through the detector aperture. The lens configuration is arranged along an optical axis. The lens configuration receives the source radiation from the aperture, and focuses it with axial chromatic dispersion towards the workpiece surface. It also receives reflected radiation from the workpiece surface and focuses the reflected radiation proximate to the detector aperture with axial chromatic dispersion.

In accordance with another aspect of the invention, in one embodiment, the chromatically dispersive lens configuration includes a doublet lens element and a positive power lens portion located further from the aperture than the doublet lens element. The doublet lens element includes a first portion located near the aperture and a second portion located farther from the aperture. The first portion of the doublet lens has a relatively low Abbe number while the second portion has a relatively high Abbe number. In some embodiments, an average of the Abbe numbers of each lens element included in the positive power lens portion is between the relatively low and high Abbe numbers of the portions of the doublet lens element.

In accordance with another aspect of the invention, the doublet lens element is a negative power lens element. In various embodiments, the doublet lens element is a low valued negative power lens element.

In accordance with another aspect of the invention, in one embodiment, the positive power lens portion is formed from three air spaced singlet lenses (e.g. a bi-convex lens element and two meniscus lens elements), all of which have spherical surfaces. The utilization of spherical lenses reduces the complexity and overall expense of the lens configuration. In accordance with a further aspect of the invention, in one embodiment, the doublet lens element is also spherical.

In accordance with another aspect of the invention, the relationship between certain material properties of the materials used in the first and second portions of the doublet lens element is opposite to their relationship as used in standard doublet lenses of similar geometry.

In accordance with another aspect of the invention, the doublet lens element provides a desirable level of negative spherical aberration which effectively cancels a substantial portion of a spherical aberration that arises in the positive lens portion. In accordance with a further aspect of the invention, in one embodiment, the average of the Abbe numbers of the first and second portions of the doublet lens element approximately matches the average Abbe number of the lenses of the positive lens portion.

In accordance with another aspect of the invention, in some embodiments, a lens configuration according to this invention may be made from relatively inexpensive components (e.g. spherical lenses), and may still be optimized by a relatively simple adjustment of a single lens of the lens configuration.

A chromatically dispersive lens configuration according to this invention has a number of advantages. In particular, a CPS optical pen may incorporate such a lens configuration and be produced with physical dimensions and costs which are comparable to or less than certain commercially available systems, while the optical throughput is improved (e.g. by 10% to 100%) as well as the spot size (e.g. by 25%), which translates into improved measurement resolution for such a CPS optical pen.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a table showing one exemplary set of Abbe numbers and refractive indices for the lens elements of the lens configuration of FIG. 1;

DETAILED DESCRIPTION OF THE PREFERRED EMBODIMENT

Figure 1:
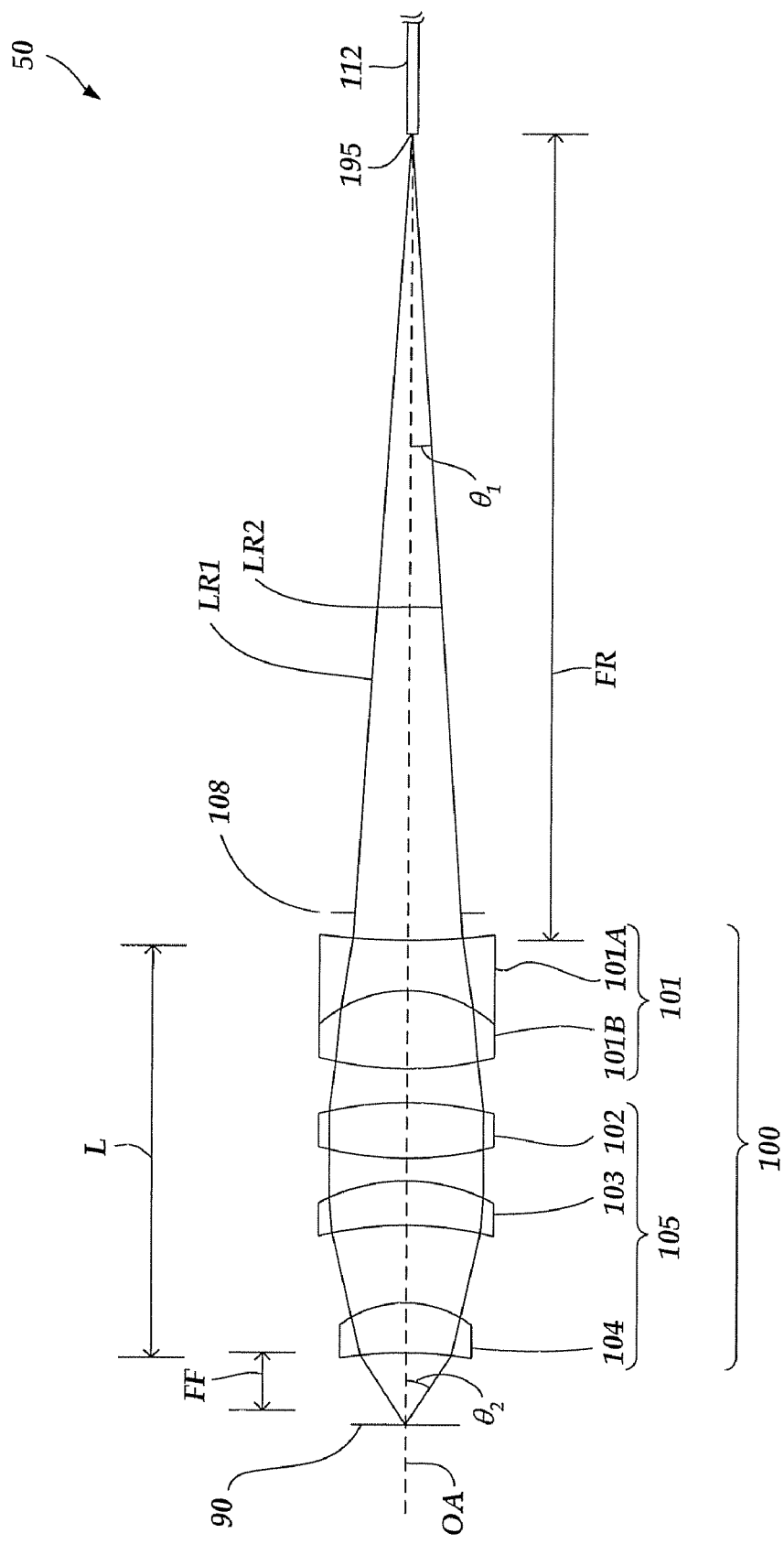
FIG. 1 is a diagram of a schematic side view of an exemplary embodiment of a chromatically dispersive lens configuration according to this invention.

FIG. 1 is a diagram 50 of a schematic side view of the operation of an exemplary embodiment of a chromatically dispersive lens configuration 100, according to this invention. The lens configuration 100 includes a doublet lens element 101, and a positive power lens portion 105. In the specific embodiment shown in FIG. 1, the positive power lens portion 105 includes a bi-convex lens element 102, and meniscus lens elements 103 and 104. The doublet lens element 101 is formed from a first lens portion 101A and second lens portion 101B. In various embodiments, the doublet lens element 101 may either be a cemented doublet or an airspace doublet. The meniscus lens elements 103 and 104 have both surfaces curved in the same direction, and are oriented so as to provide positive optical power and focus the radiation output from the lens configuration 100, approximately as shown in FIG. 1. In the configuration illustrated in FIG. 1, the spherical aberration of the positive power lens portion 105 may be more easily controlled or configured by splitting the focusing lens operations into the three air spaced singlet lenses 102-104. However, in various other embodiments, the lenses 102-104 may be replaced by a greater number of lenses, or by a single suitably designed aspheric lens, in the positive power lens portion 105.

As will be described in more detail below with respect to FIG. 4, during operation, light from an in/out optical fiber 112 is output from a detector aperture 195 that is fixed relative to the lens configuration 100 to provide an output light beam along an optical axis. In one embodiment, the end of the core of the in/out optical fiber 112 may provide the aperture 195 (e.g. an aperture that is approximately the same as a core diameter of 50 microns, or alternatively 20 microns for a tapered fiber core). The output light beam within the representative limiting rays LR1 and LR2 may be limited by an optional aperture stop 108 and, in any case, may continue through the doublet lens element 101, to be focused on a workpiece surface 90 by the positive power lens portion 105. Upon reflection from the workpiece surface 90, the light is refocused by the lens configuration 100 onto the aperture 195 as illustrated by the limiting rays LR1 and LR2. A distance FR represents the spacing between the back of the lens configuration 100 and the aperture 195. Due to the axial chromatic dispersion provided by lens configuration 100, only one wavelength will be in focus at the surface 90, and the distance from the lens configuration 100 to the surface 90 determines which wavelength is best focused. The wavelength that is best focused at the surface 90 will also be the wavelength that is best focused at the aperture 195. Therefore, the light received into the core of the in/out optical fiber 112 through aperture 195 will be spatially filtered to have predominantly the best focused wavelength. In various embodiments, the in/out optical fiber 112 routes the signal light to a spectrometer (not shown) that is utilized for determining the wavelength corresponding to the highest signal level, thus determining the distance to the workpiece surface 90.

FIG. 1 shows the convergence/divergence angles $\theta_1$ and $\theta_2$ and the front and rear focus dimensions FF and FR. The rear focus dimension FR extends from the aperture 195 to the rear of the lens configuration 100, and a front focus dimension FF extends from the front of the lens configuration 100. In one embodiment, the detector collection numerical aperture ($NA_{det}$) is related to the angle $\theta_1$ by the following equation:

$$NA_{det} = \sin \theta_1 \quad\quad\quad (\text{Eq. 1})$$

In addition, the object numerical aperture at the workpiece surface ($NA_{object}$) is related to the focal angle $\theta_2$ by the following equation:

$$NA_{object} = \sin \theta_2 \quad\quad\quad (\text{Eq. 2})$$

For a given dimension of the aperture 195, the demagnification ratio ($NA_{det}/NA_{object}$) may determine that lateral dimension of the focused measurement spot on the workpiece surface 90. Therefore, the demagnification ratio may be a significant design parameter to be satisfied by the lens configuration 100 in various embodiments, as described in greater detail elsewhere herein.

It will be appreciated that $\sin \theta_2$, and the front focus dimension FF, will generally depend on the wavelength of light, due to the axial chromatic dispersion provided by the lens configuration 100. Various considerations related to providing a desirable axial chromatic dispersion are described in greater detail below. FIG. 1 also shows a lens group length dimension L, representing the axial dimension spanned by the lens configuration 100. Since a compact CPS optical pen is generally advantageous, the lens group length dimension L and/or the dimension (FR+L) may be a significant design parameter to be satisfied by the lens configuration 100 in various embodiments. In one specific example embodiment, the sum of the dimensions FR and L is approximately 139 mm, and FIG. 1 is drawn approximately to scale. However, in various other embodiments the scaled dimensions of FIG. 1 are illustrative only, and not limiting. More generally, the various embodiment of the particular lens configuration 100 illustrated in FIG. 1 may be implemented and/or adapted to be suitable for a variety of applications (e.g by selection of suitable lens element surface radii and axial spacings) based on reasonable variations of the lens surface configurations shown in FIG. 1 and the material properties shown and described below with reference to FIG. 2, along with the use of known analytical and/or computerized optical design and/or simulation techniques to guide those variations.

For a given geometry the front focus dimension FF and the amount of axial chromatic dispersion provided by the lens configuration 100 generally depends on the refractive indices and Abbe numbers of the lenses 101-104. As described in Warren J. Smith, Modern *Optical Engineering*, Third Edition, p. 94, McGraw-Hill, 2000, the material refractive index variation with wavelength causes the axial separation of focus, and the Abbe number quantifies index variation with wavelength, in accordance with the following equation:

$$v_d = \frac{n_d - 1}{n_F - n_C} \quad \text{(Eq. 3)}$$

Where $v_d$ is the Abbe number and $n_d$, $n_F$, and $n_C$ are the material refractive indices at the helium d line, 587.6 nm, and the hydrogen F and C lines (486.1 nm and 656.3 nm, respectively). Smaller Abbe numbers imply greater focal variation with wavelength.

Furthermore, as described in Joseph M. Geary, *Introduction to Lens Design*, p. 176, Willmann-Bell, 2002, the focal length variation for a singlet lens between F and C wavelengths is given by:

$$\Delta f_{FC} = \frac{f_d}{v_d} \quad \text{(Eq. 4)}$$

where $f_d$ is the focal length at the helium d wavelength (587.6 nm). Again, lenses using smaller Abbe number glasses have greater focal length shifts with wavelength.

In various embodiments, the doublet lens element 101 and the positive power lens portion 105 may be configured with various combinations of features according to this invention, in order to provide various desirable attributes for a CPS optical pen. In particular, in various embodiments, the doublet lens element 101 is not a typical doublet lens. In general, the first lens portion 101A, which is nearer to the aperture 195, comprises at least one concave surface, and the second lens portion 101B, which is farther from the aperture 195, comprises at least one convex surface. According to the principles of this invention, in various embodiments the first lens portion 101A has a relatively lower Abbe number while the second lens portion 101B has a relatively higher Abbe number. In contrast, the relationship between the Abbe numbers of the corresponding first and second portions of conventional doublet lenses is reversed compared to the first and second lens portions 101A and 101B.

In various embodiments according to this invention, the doublet lens element 101 may generally be a low powered lens element, or a negative power lens element, or both. In the particular embodiment illustrated in FIG. 1, it is a low power negative power lens element, which generally expands the output beam received from the aperture 195. In one embodiment, the doublet lens element 101 provides a negative power lens element, where the magnitude of the negative power is approximately 10% times the total power of the lens configuration 100. More generally, in some embodiments, the magnitude of the negative power may be at most approximately 50% of the total power of the lens configuration 100, and in other embodiments, the magnitude of the negative power may be advantageously at most approximately 20% of the total power of the lens configuration 100. However, in various other embodiments, the doublet lens element 101 may comprise a low power positive lens element, provided that other design principles disclosed herein are fulfilled. For example, in some embodiments, the magnitude of the positive power may be at most approximately 40% of the total power of the lens configuration 100, and in other embodiments, the magnitude of the power may be advantageously at most approximately 20% of the total power of the lens configuration 100.

In the particular embodiment illustrated in FIG. 1, the first lens portion 101A and the second lens portion 101B provide approximately the same optical power, but with opposite signs, which may simplify achieving a combination of spherical aberration and axial chromatic dispersion that is desired for the doublet lens element 101, as outlined below.

In various embodiments, the doublet lens element 101 is configured to provide a desirable level of negative spherical aberration which effectively cancels a substantial portion of a positive spherical aberration that arises in the positive lens portion. A doublet lens element providing the proper negative spherical aberration may be designed based on the principles disclosed herein, in conjunction with the use of known computerized optical design and/or simulation techniques.

In some embodiments, a simpler more easily fabricated lens configuration results when the first lens portion 101A and the second lens portion 101B are spherical lens portions. In some embodiments, a simpler more easily fabricated lens configuration results when the average of the Abbe numbers of the first and second lens portions of the doublet lens element 101 approximately matches the average Abbe number of the lenses included in the positive lens portion 105.

In the particular embodiment illustrated in FIG. 1, the configuration of the positive power lens portion 105 includes the three air spaced singlet lens elements 102-104. In one embodiment, each of the lens elements 102-104 has spherical surfaces. The utilization of spherical lenses may reduce the overall expense of the lens configuration. In one embodiment, all of the lens elements of the lens configuration 100 are spherical lenses.

FIG. 2 is a table 200 showing one exemplary set of Abbe numbers and refractive indexes for the lens elements 101A, 101B, 102, 103 and 104 of FIG. 1. The material properties shown in table 200 may be used in combination with the lens configuration 100 shown in FIG. 1, to provide an embodiment corresponding to any and/or all of the various desirable combinations of features outlined above. More specifically, in the embodiment shown in FIG. 2 the first lens portion 101A has a relatively lower Abbe number of 25.4 and a refractive index of 1.8, while the second lens portion 101B has a relatively higher Abbe number of 45.8 and a refractive index of 1.5. The average Abbe number of the corresponding doublet lens element 101 is therefore 35.6. The lens element 102 has an Abbe number of 35.3 and a refractive index of 1.7. The lens element 103 has an Abbe number of 39.3 and a refractive index of 1.7. The lens element 104 has a Abbe number of 39.7 and a refractive index of 1.7. The average Abbe number of the corresponding positive lens portion 105 is therefore 38.1.

In some embodiments, it may be advantageous if the difference between the average Abbe numbers of the doublet lens element 101 and the positive lens portion 105 is at most 10, and even more advantageous if it is at most 5. In the exemplary embodiment shown in FIG. 2, that difference is 2.5.

Figure 3:
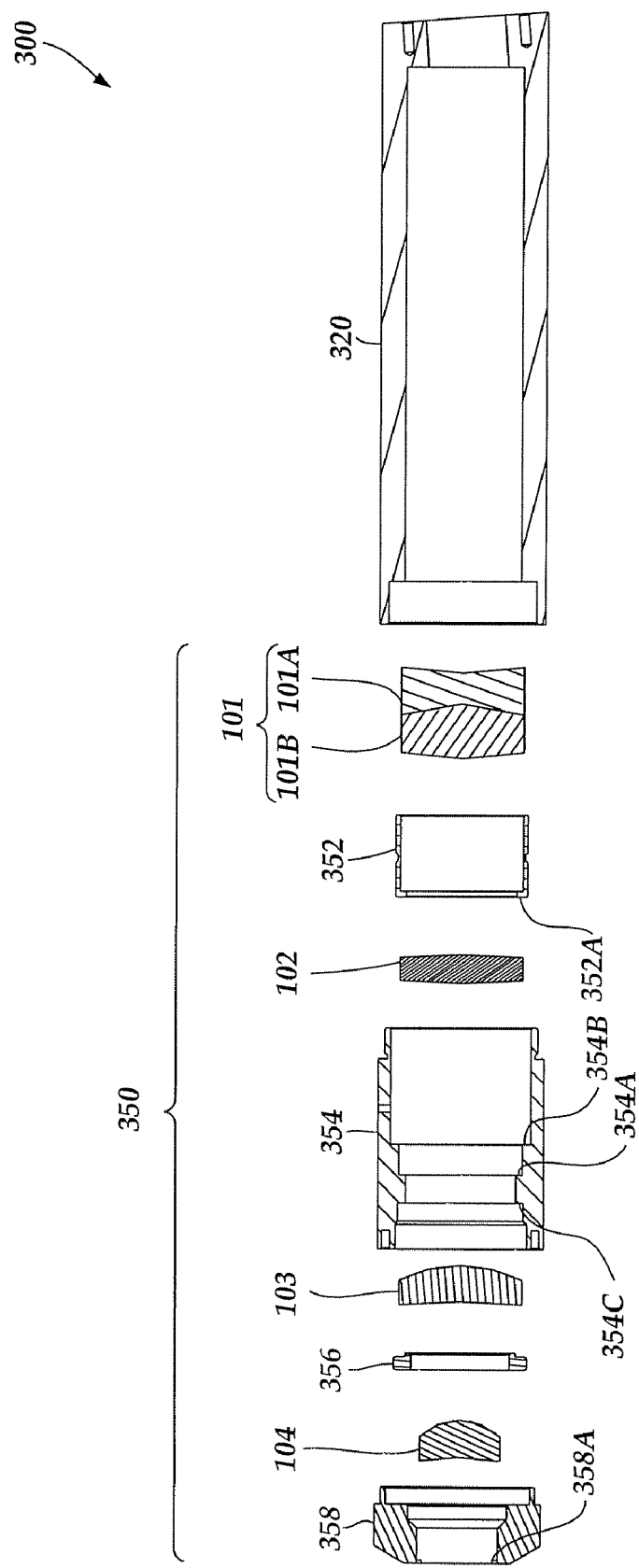
FIG. 3 is a diagram of an exploded view of selected portions of an exemplary CPS optical pen configuration, including the lens configuration of FIG. 1.

FIG. 3 is a diagram of an exploded view of selected portions of an exemplary CPS optical pen 300 including the elements of lens configuration 100 of FIG. 1. The selected portions of the CPS optical pen 300 include a housing assembly 320 and an optics portion 350, wherein the optics portion 350 includes the elements of the lens configuration 100 in addition to other components. More specifically, in the embodiment shown in FIG. 3, the optics portion 350 includes the lens elements 101A, 101B, 102, 103 and 104, as well as a retaining element 352 including a positioning shoulder 352A, an assembly element 354 including positioning shoulders 354A-354C, a retaining ring 356 and an end element 358 including a positioning shoulder 358A.

When assembled, the lens element 102 may abut the positioning shoulder 354A and a first side of the positioning shoulder 352A, while lens element 101 may abut the other side of the positioning shoulder 352A. The lens element 103 may abut the positioning shoulder 354C and the retaining ring 356. The lens element 104 may abut the positioning shoulder 358A. The assembly element 354 may approximately abut the end element 358 and the housing 320. Any elements not held in place by compression, adjacent surfaces, and/or friction forces may be fixed in position by adhesive or other conventional means.

In one embodiment, the lens element 104 is fixed to the end element 358, and the lens elements 101-103 are fixed to the assembly element 354 before fixing the end element 358 to the assembly element 354. In such an embodiment, the axial position and tilt of the lens element 104 may be adjusted relative to the lens elements 101-103. One exemplary adjustment procedure may be performed as outlined here. The end element 358 may be assembled to approximately abut the assembly element 354 in an assembly and test jig. Broadband light may be projected from a standardized in/out test aperture (e.g. an in/out fiber aperture located to correspond to the rear focal distance FR shown and described with reference to FIG. 1) through the lens elements 101-103 in the assembly element 354 to the lens 104 element in the end element 358. The lens 104 will focus the broadband light to a spot on a desired "average" focal plane. The spot may be observed at the desired focal plane by any convenient means. The axial position of the end element 358 and the lens 104 may be adjusted to provide the minimum spot size at the focal plane, and their tilt may be adjusted to provide the most symmetric distribution of illumination within the spot. An overall best combination of minimum spot size and distribution symmetry will also generally result in a reflected light beam that returns to the standardized in/out test aperture to provide a maximum signal strength and narrowest spectral peak, as measured on a spectrometer attached to the in/out optical fiber. When a desired performance is provided in terms of spot size and symmetry, and/or in terms of the resulting spectral characteristics if desired, then the end element 354 is fixed to the assembly element 354 by adhesive or other conventional means. Of course, this adjustment method is just one of many possible optical adjustment procedures that may provide equivalent results, and should therefore be considered only illustrative and not limiting.

In one exemplary embodiment, an adjustment procedure that adjusted only the axial position and tilt of the lens 104, relative to an "as mechanically assembled" set of lenses 101-103, was applied to a number of chromatically dispersive lenses built according to the particular configurations of FIG. 1 and FIG. 2. The required axial adjustment range for the lens 104 relative to the lenses 101-103 was on the order of +/−0.1 mm, when the lens elements were fabricated using readily available lens fabrication tolerances. When used in a CPS optical pen configuration approximately as illustrated and described below with reference to FIG. 4, the results were sufficient to provide spectrometer signals with characteristics such as signal strength, spectral peak width, and spectral peak symmetry that were significantly improved relative to comparable previously known CPS optical pens. In particular, compared to a legitimately comparable conventional CPS optical pen (a conventional pen having a similar nominal standoff and measurement range), the actual CPS optical pens that used a lens configuration according to this invention provided the following features and advantages: An identical pen diameter was be used. An identical broadband wavelength range (e.g. 450-700 nm) was used. An identical aperture diameter (e.g. in the range of 20-50 microns) was used. An identical $NA_{object}$=0.5 and standoff distance=5.68 mm were used. An improved demagnification (on the order 0.14) was provided, while using a representative dimension (FR+L) that was less than a comparable dimension of the conventional CPS optical pen (e.g. on the order of 140 mm). An improved spot diameter was provided, approximately 25% smaller than the spot diameter provided by the conventional CSP optical pen (e.g. on the order of 4 microns). In addition, the spot size vs. wavelength was improved to a level of variation that was not detectable, whereas the spot size of the conventional CSP optical pen varied by more than 5%.

Importantly, the optical throughput was also improved in the actual CPS optical pens according to this invention. In particular, based on analysis of the spectral peak for several measuring distances, and using the same spectrometer used for the conventional CPS optical pen, the optical throughput (i.e. the spectral peak height) were improved by 10% to 100%. In addition, the spectral peaks also tended to be more symmetrical. Symmetric spectral peaks support improved sub-pixel interpolation of the peak location on the spectrometer detector array, thus improving the potential distance measurement resolution and accuracy of a CPS optical pen.

Figure 4:
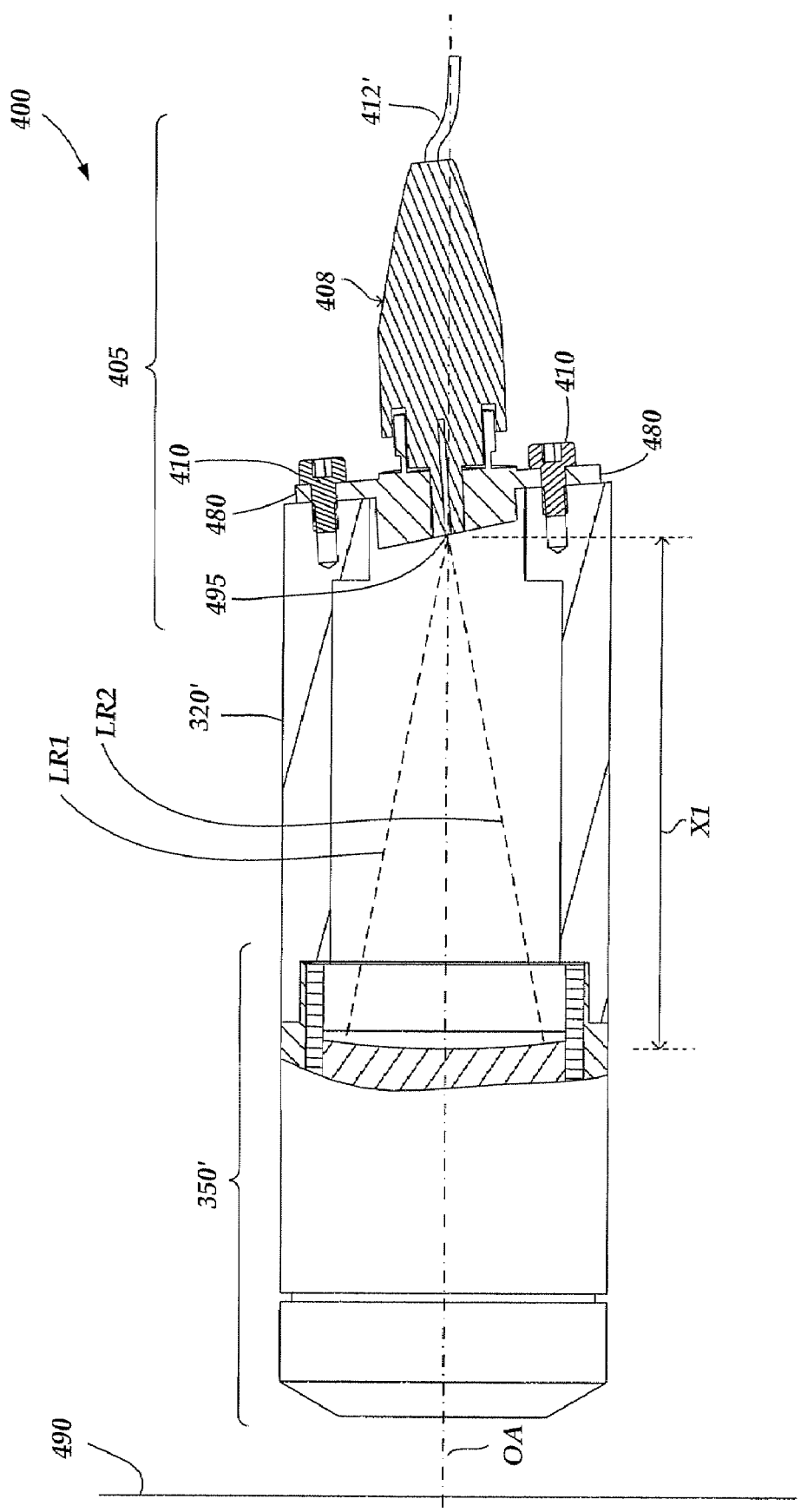
FIG. 4 is a diagram of a cross-section of an assembled CPS optical pen, including components similar to those shown in FIG. 3, and further including an in/out fiber optic portion.

FIG. 4 is a diagram of a cross-section of an assembled CPS optical pen 400. As shown in FIG. 4, the CPS optical pen 400 includes a housing assembly 320' and an optics portion 350', which may be similar or identical to the similarly numbered (unprimed) components shown in FIG. 3. In any case, the optics portion 350' includes a chromatically dispersive lens configuration according to this invention. The general operation of the CPS optical pen 400 may be understood based on the previous figures and description disclosed herein.

The CPS optical pen 400 further includes an in/out fiber optic sub-assembly 405 that includes a mounting element 480, that may be attached to the end of the housing 320' using mounting screws 410. The in/out fiber optic sub-assembly 405 receives an in/out optical fiber (not shown) through the fiber optic cable 412' which encases it, and through a fiber optic connector 408. The in/out optical fiber outputs an output beam through an aperture 495, and receives reflected measurement signal light through the aperture 495, in a manner similar to that previously described with reference to the in/out optical fiber 112 and the aperture 195 shown in FIG. 1. In one embodiment, the aperture 495 is provided by the end of a core of the in/out optical fiber. However, in various other embodiments, the in/out fiber optic sub-assembly 405 may comprise a separate aperture element (not shown) that provides the aperture 495, as is described in more detail in copending and commonly assigned U.S. patent application Ser. No. 11/691,744 titled "Chromatic Confocal Sensor Fiber Interface", which is hereby incorporated herein by reference in its entirety.

It will be appreciated that a chromatically dispersive lens configuration according to this invention has a number of advantages. In particular, a CPS optical pen can incorporate such a lens configuration and be produced at dimensions which are comparable to certain commercially available systems (e.g. the STIL pen OP 300NL), while the optical throughput is improved (e.g. 10% to 100%) as well as the spot size (e.g. 25% improvement) which translates into improved measurement resolution for the system. Furthermore, a lens configuration according to this invention may in some embodiments be made from relatively inexpensive components (e.g. spherical lenses), and may be optimized by relatively simple adjustment of a single lens of the lens configuration.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A CPS optical pen operable to provide a signal usable to measure a distance to a surface, the CPS optical pen comprising:
    a housing;
    an aperture that outputs source radiation and receives reflected radiation; and
    a lens configuration arranged along an optical axis of the CPS optical pen to receive the source radiation from the aperture, focus the source radiation and output it toward the surface with axial chromatic dispersion, receive reflected radiation from the surface and focus the reflected radiation proximate to the aperture with axial chromatic dispersion, the lens configuration comprising:
        a doublet lens element comprising a first portion located nearer to the aperture and a second portion located farther from the aperture; and
        a positive power lens portion located farther from the aperture than the doublet lens element, the positive power lens portion including at least one lens element, wherein:
    the first portion of the doublet lens has a first Abbe number, the second portion of the doublet lens has a second Abbe number that is higher than the first Abbe number, and the doublet lens provides an optical power that is one of a) a negative optical power and b) a positive optical power that is less than 40% a total optical power of the lens configuration.

2. The CPS optical pen of claim 1, wherein the doublet lens provides a negative optical power having a magnitude that is less than 50% of the total optical power of the lens configuration.

3. The CPS optical pen of claim 2, wherein the doublet lens provides a negative optical power having a magnitude that is less than 25% of the total optical power of the lens configuration.

4. The CPS optical pen of claim 3, wherein the doublet lens provides a negative optical power having a magnitude that is less than 15% of the total optical power of the lens configuration.

5. The CPS optical pen of claim 1, wherein the doublet lens provides a positive optical power having a magnitude that is less than 25% of the total optical power of the lens configuration.

6. The CPS optical pen of claim 5, wherein the doublet lens provides a negative optical power having a magnitude that is less than 15% of the total optical power of the lens configuration.

7. The CPS optical pen of claim 1, wherein the doublet lens provides a negative optical power having a magnitude that is less than 25% of the total optical power of the lens configuration, and the positive power lens portion comprises:
    a bi-convex lens element located proximate to the second portion of the doublet lens element;
    a first meniscus lens element located proximate to the bi-convex lens element; and
    a second meniscus lens element located proximate to the first meniscus lens element.

8. The CPS optical pen of claim 7, wherein each of first and second meniscus lens elements provide positive optical power.

9. The CPS optical pen of claim 8, wherein the bi-convex lens element provides positive optical power.

10. The CPS optical pen of claim 7, wherein the bi-convex lens element has an Abbe number of at least 32 and at most 38, and the first and second meniscus lenses each have an Abbe number of at least 37 and at most 42.

11. The CPS optical pen of claim 10, wherein the bi-convex lens element has an index of refraction of at least 1.7 and at most 1.8, and the first and second meniscus lenses each have an index of refraction of at least 1.6 and at most 1.7.

12. The CPS optical pen of claim 7, wherein each lens element of the lens configuration is a spherical lens element.

13. The CPS optical pen of claim 7, wherein the first Abbe number is lower than 30.

14. The CPS optical pen of claim 13, wherein the first portion of the doublet lens has an index of refraction of at least 1.70 and at most 1.90.

15. The CPS optical pen of claim 13, wherein the second Abbe number is lower than 50.

16. The CPS optical pen of claim 15, wherein the second portion of the doublet lens has an index of refraction of at least 1.45 and at most 1.65.

17. The CPS optical pen of claim 7, wherein the individual Abbe number of each at least one lens element included in the positive power lens portion is between the first and second Abbe numbers.

* * * * *